United States Patent [19]
Abe et al.

[11] Patent Number: 6,016,954
[45] Date of Patent: Jan. 25, 2000

[54] CARD HOLDER-TYPE BALANCE READER

[75] Inventors: Yuhei Abe, Hitachinaka; Atsuhiko Urushibara, Tokyo; Masayuki Ohki, Kokubunji; Takeshi Hoshino, Kodaira; Hiroyuki Hanyu, Hitachinaka, all of Japan

[73] Assignee: Hitachi, Ltd., Tokyo, Japan

[21] Appl. No.: 08/808,832

[22] Filed: Feb. 28, 1997

[30]     Foreign Application Priority Data

Feb. 28, 1996 [JP] Japan .................................. 8-041138

[51] Int. Cl.[7] .................................................. G06F 15/30
[52] U.S. Cl. ........................................... 235/379; 235/380
[58] Field of Search ..................................... 235/379, 380

[56]      References Cited

U.S. PATENT DOCUMENTS

| 5,221,838 | 6/1993 | Gutman et al. | ........................ 235/472 |
| 5,744,787 | 4/1998 | Teicher | ..................................... 235/380 |

*Primary Examiner*—Harold I. Pitts
*Attorney, Agent, or Firm*—Antonelli, Terry, Stout & Kraus, LLP

[57]    ABSTRACT

A card holder provides a balance reader for an IC card utilized for a system for settling cash utilizing the IC card. The balance reader is provided with the card holder-type body having a card slot provided in the body. A liquid-crystal display and at least one push-button are arranged on the body for user interface. A cover member is attached to the body via a hinge so that it can be opened or closed. When an IC card is inserted into the body and the push-button is pressed, the liquid-crystal display is lit and the current balance of currency is displayed on the liquid-crystal display. When the cover member is opened and the IC card is extracted, the display of the balance is switched to a blinking display. When a settlement is performed using the IC card, a microcomputer in the body can operate to display the balance after the settlement as well as a paid or received amount, in addition to the previous balance before the settlement.

10 Claims, 8 Drawing Sheets

CARD HOLDER-TYPE BALANCE READER

BACKGROUND OF THE INVENTION

1. Field of the Invention

The present invention relates to a balance reader for a card used for a system for settling a small amount electronically utilizing an IC card.

2. Description of Related Art

In a so-called electronic small amount settlement system for immediately settling accounts utilizing electronic information, electronic information equivalent to cash is stored in a card such as an IC card and a user carries such a card with him/her. In this system, it is required to read an amount stored in a card before a settlement, to settle an amount to be paid and to confirm the balance.

This system employs equipment called an electronic purse provided with functions for reading and writing electronic information for settling an amount to be paid after inserting a user's card and the other card, such as a merchant, and a card holder for only one card. The card holder is provided with only a function (a balance reading function) for reading information.

This type of system is disclosed in, for example, Japanese published examined patent application No. H1-55511 which is hereby incorporated by reference.

SUMMARY OF THE INVENTION

The function of an electronic purse is to perform and process a variety of transactions using a micro-computer with relatively high functions. The function of previous card holder-type balance readers is limited to read and display a current balance recorded in a card with a low-priced card holder for wide use.

The object of the present invention is to provide card holder capable of reading and displaying a balance and related information using a small-sized microcomputer.

It is a further object to provide such a display while minimizing size and power requirements.

A balance reader according to the present invention is provided with the body for housing a card for recording the data of electronic currency, a screen for display provided on the body, a microcomputer for communicating with the card via a terminal and a power source as its basic constitution.

The above microcomputer is provided with means for storing a first balance recorded in a card before a settlement, means for storing a second balance after the settlement and means for operating based upon the first balance and the second balance and displaying the result on the screen.

The microcomputer can also be provided with means for storing a first balance recorded in a card before a settlement and means for displaying the balance for a predetermined time when a cover member is opened.

The present invention relates to a card holder-type balance reader used for a system for settling cash transactions utilizing an IC card as described above, and the object of the present invention is to provide a balance reader for efficiently reading and displaying the balance of a card before a settlement and an amount paid from the balance of the card before the settlement.

According to the present invention, functions for achieving such a display can also be minimized, and a compact and low-priced balance reader can be obtained.

DETAILED DESCRIPTION OF THE PREFERRED EMBODIMENTS

Figure 1:
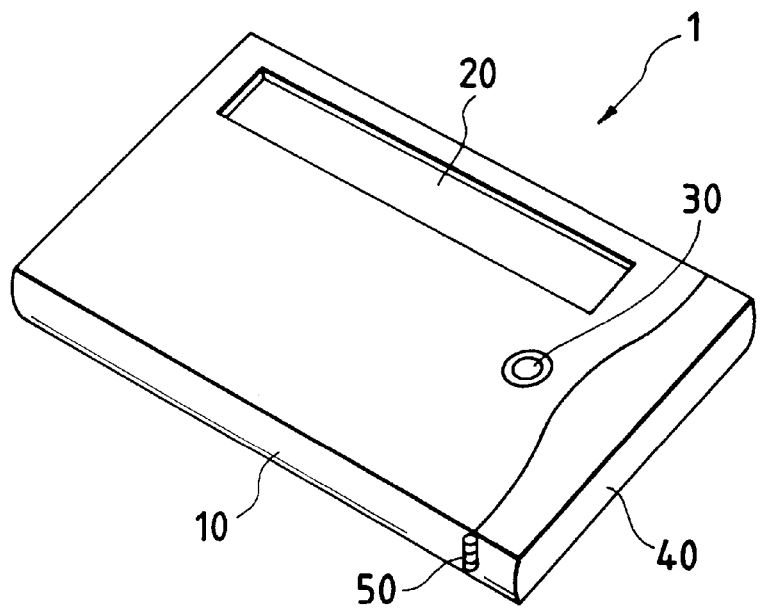
FIG. 1 is a perspective drawing showing the appearance of a card holder-type balance reader equivalent to an embodiment according to the present invention.

FIG. 1 is a perspective drawing showing the appearance of a card holder-type balance reader according to the present invention.

A balance reader card holder whose entire body is denoted by a reference number 1 is provided with the body 10 for housing a card. The body 10 is provided with a power source (e.g., a battery) and a microcomputer etc. On the surface of the body 10 a screen 20 such as a liquid-crystal display (LCD) is provided. A button switch 30 is provided in a part of the body 10, and the type and the location for this switch 30 can be selected arbitrarily. Preferably, the body 10 is manufactured using a durable plastic material, although the invention is not necessarily limited to this.

A slot for inserting a card is formed in a part of the body 10 and a cover member 40 for opening or closing the opening of this slot is attached via a hinge 50.

Figure 2:
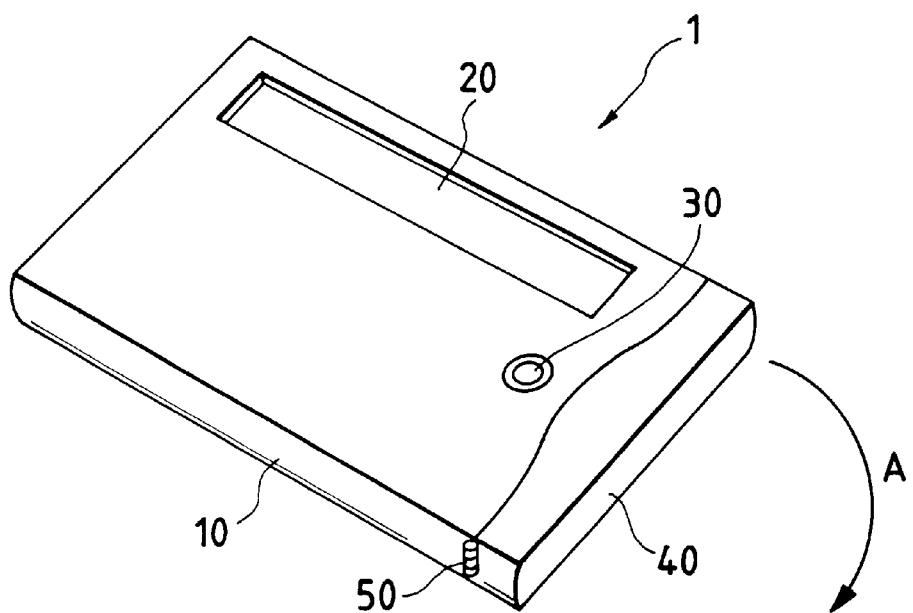
FIG. 2 is a perspective drawing showing the appearance of the card holder-type balance reader equivalent to the embodiment according to the present invention.

FIG. 2 shows that the cover member 40 can be opened in the direction shown by an arrow A via the hinge 50. The cover member 40 is held in a closed position by a suitable stopper when the cover member is closed. Thus, dust and other undesirable elements are prevented from invading into the body.

Figure 3:
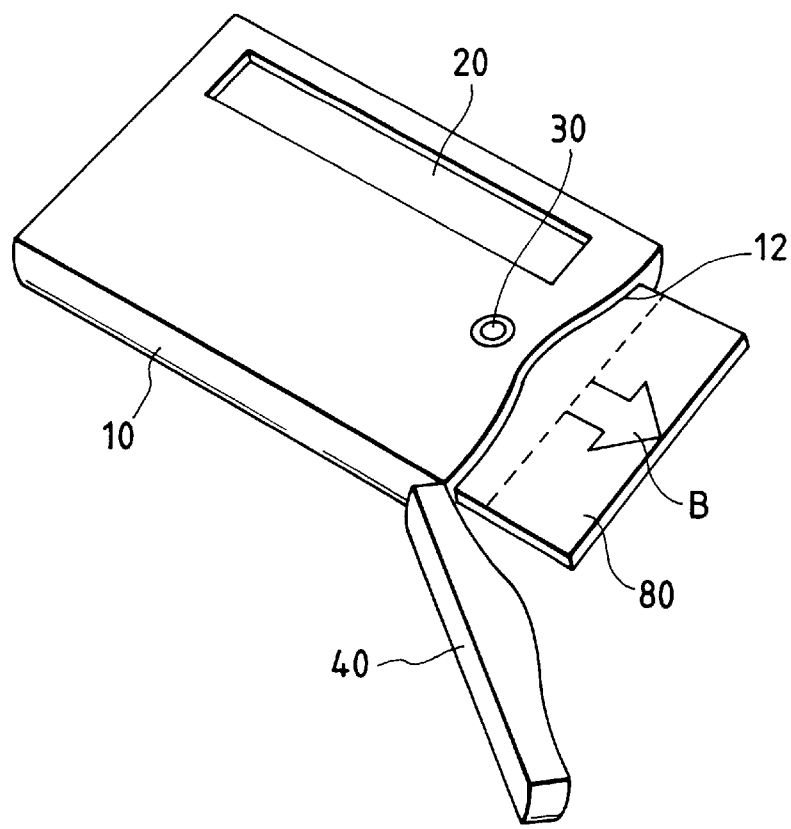
FIG. 3 is a perspective drawing showing the appearance of the card holder-type balance reader equivalent to the embodiment according to the present invention when its cover member is opened.

FIG. 3 shows a state in which the cover member 40 is open and a state in which a card 80 housed inside is pushed out to some extent in the direction shown by an arrow B via the slot 12 of the body 10 by opening the cover member 40.

Figure 4:
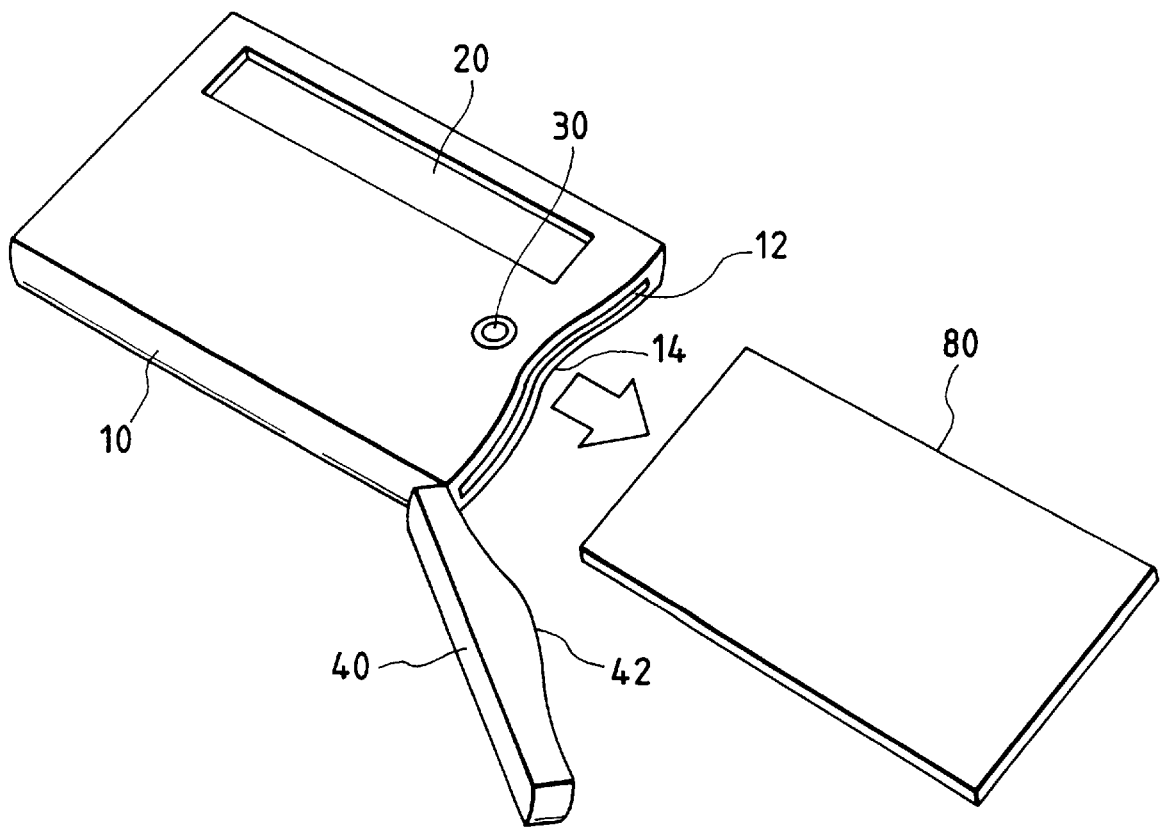
FIG. 4 is a perspective drawing showing the appearance of the card holder-type balance reader equivalent to the embodiment according to the present invention when a card is extracted.

FIG. 4 shows a state in which the card 80 is completely extracted out of the slot 12 of the body 10 of the balance display card reader. Inserting or extracting the card 80 is facilitated by forming the center 14 of the opening of the slot 12 so that it is concave by curving it. A card holder-type balance reader which is also excellent in design can be provided by also forming the center 42 inside the cover member 40 so that it is convex opposite the concave portion of this body.

Figure 5:
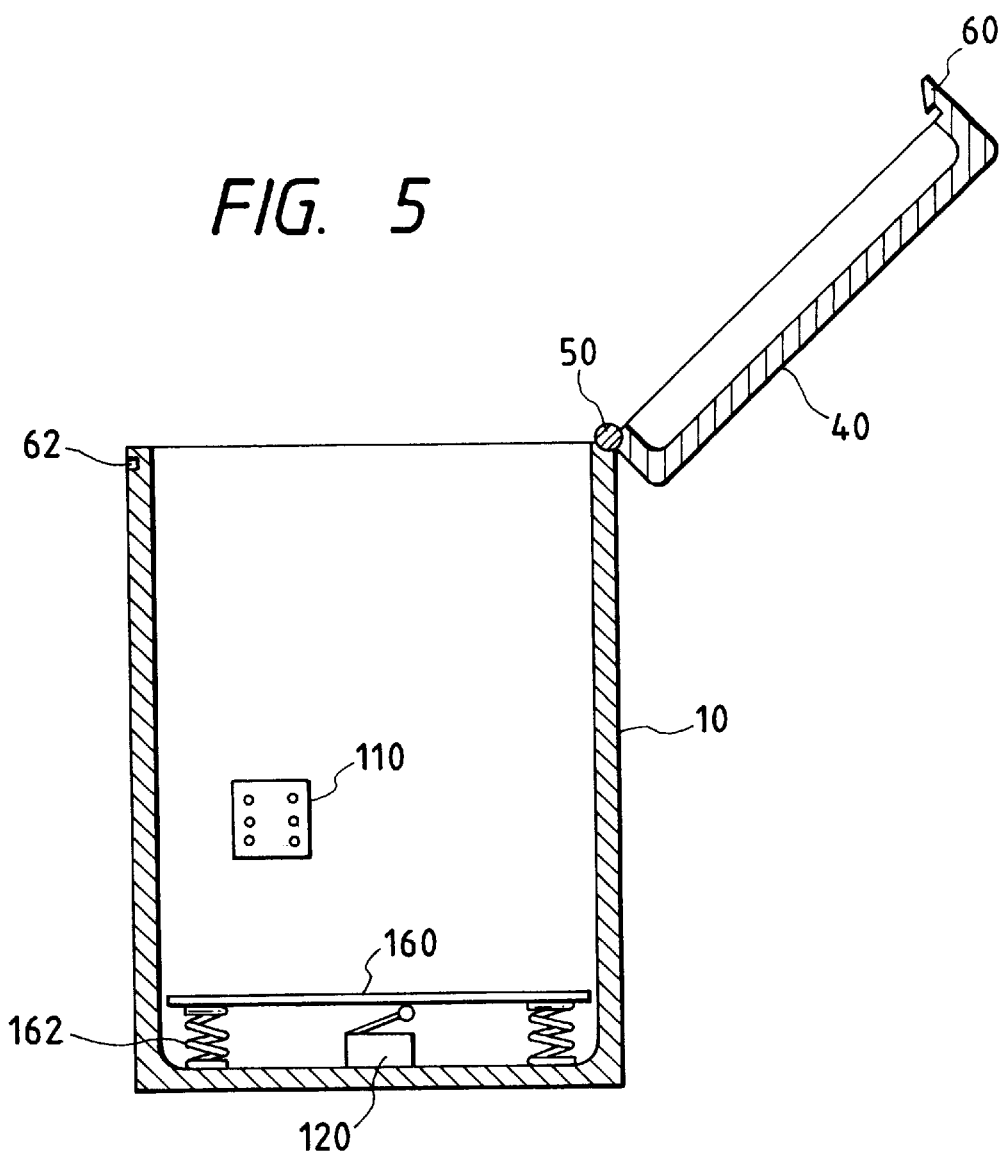
FIG. 5 is a cross section showing the appearance of the card holder-type balance reader equivalent to the embodiment according to the present invention.

FIG. 5 is a cross section showing a card pushing mechanism.

A push plate 160 is arranged at the bottom of the slot of the body 10 via a spring 162. When a card is inserted into the slot, the push plate 160 is pressed. In this state, the stopper 60 of the cover member 40 is fitted into a catcher 62 on the side of the body 10 and, as a result, the cover member 40 is closed. The push plate 160 presses the spring 162 and a cover interlocked switch 120 detects that the card is inserted.

When the stopper 60 is detached from the catcher 62, the cover member 40 is opened and the card is pushed outside through the slot by the return force of the spring 162 pressed via the push plate 160.

Figure 6:
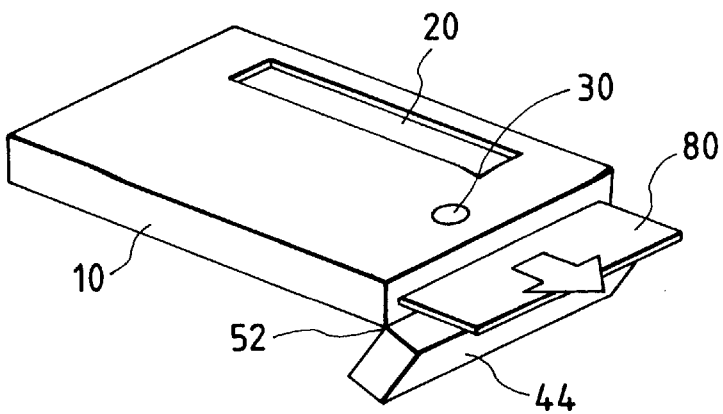
FIG. 6 shows another embodiment according to the present invention.

FIG. 6 shows another embodiment according to the present invention and an example in which the opened or closed direction of a cover member 44 is changed. In this balance reader, the cover member 44 is also attached to the body 10 via a hinge 52.

Figure 7:
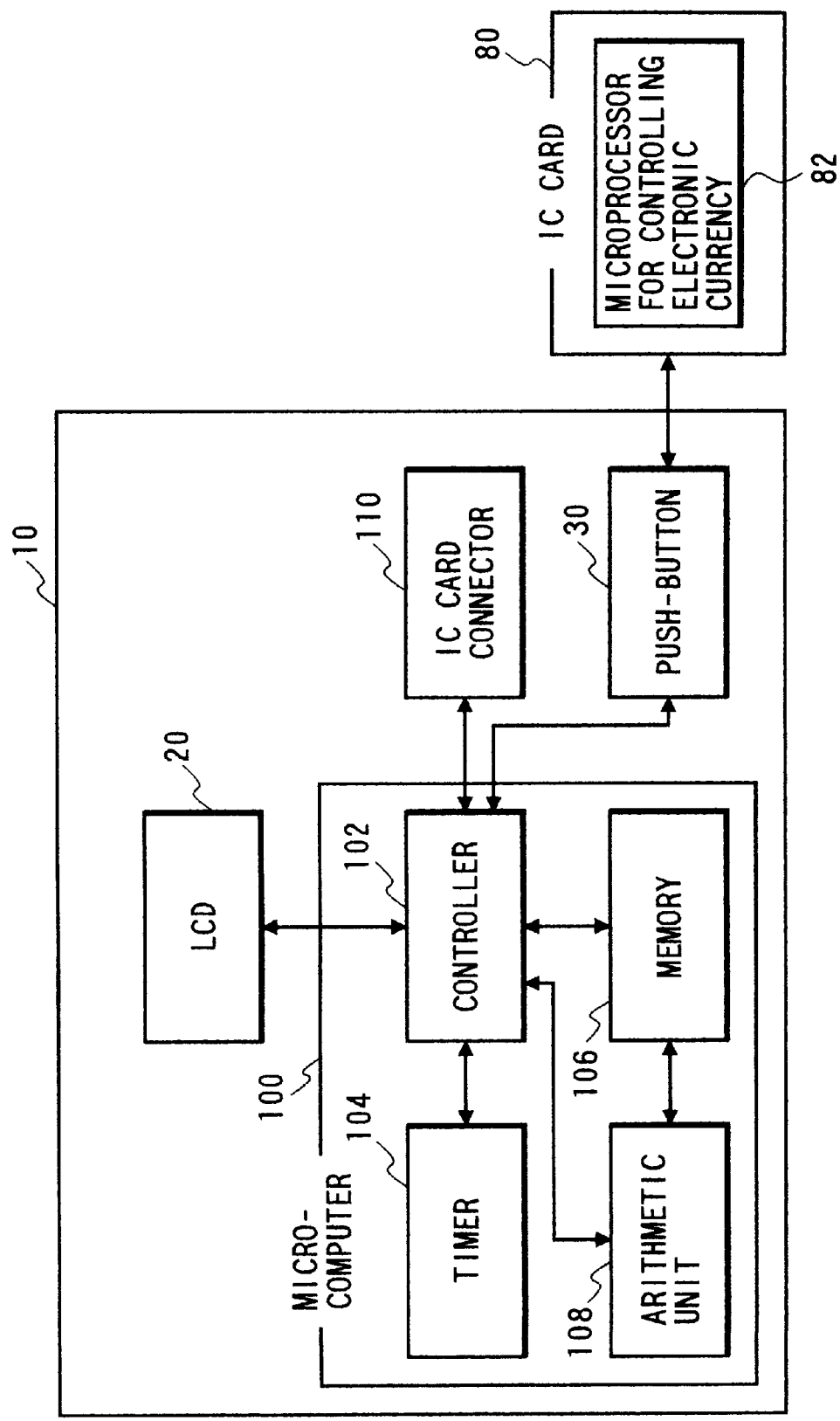
FIG. 7 is a functional block diagram showing elements for providing a balance reader according to the present invention.

FIG. 7 is a functional block diagram showing elements for providing a balance reader according to the present invention.

A microcomputer 100 is provided with means such as a controller 102, a small-sized memory 106, a timer 104 and an arithmetic unit 108 and a terminal 110 for communicating data with the microprocessor 82 of the card 80. A balance is displayed on the liquid-crystal display 20 by pressing the push-button 30. The microcomputer 100 can be located at any convenient location in the body 10. For example, it can be embedded with the plastic material of the body, mounted on an outer surface of the body, or provided in a recessed area which can be accessed through a cover (not shown). One possible location for the terminal 110 is on along one wall of the slot 12 (e.g., see FIG. 5) so that it can contact a terminal (not shown) on the face of the card when the card is inserted in the slot.

Figure 8:
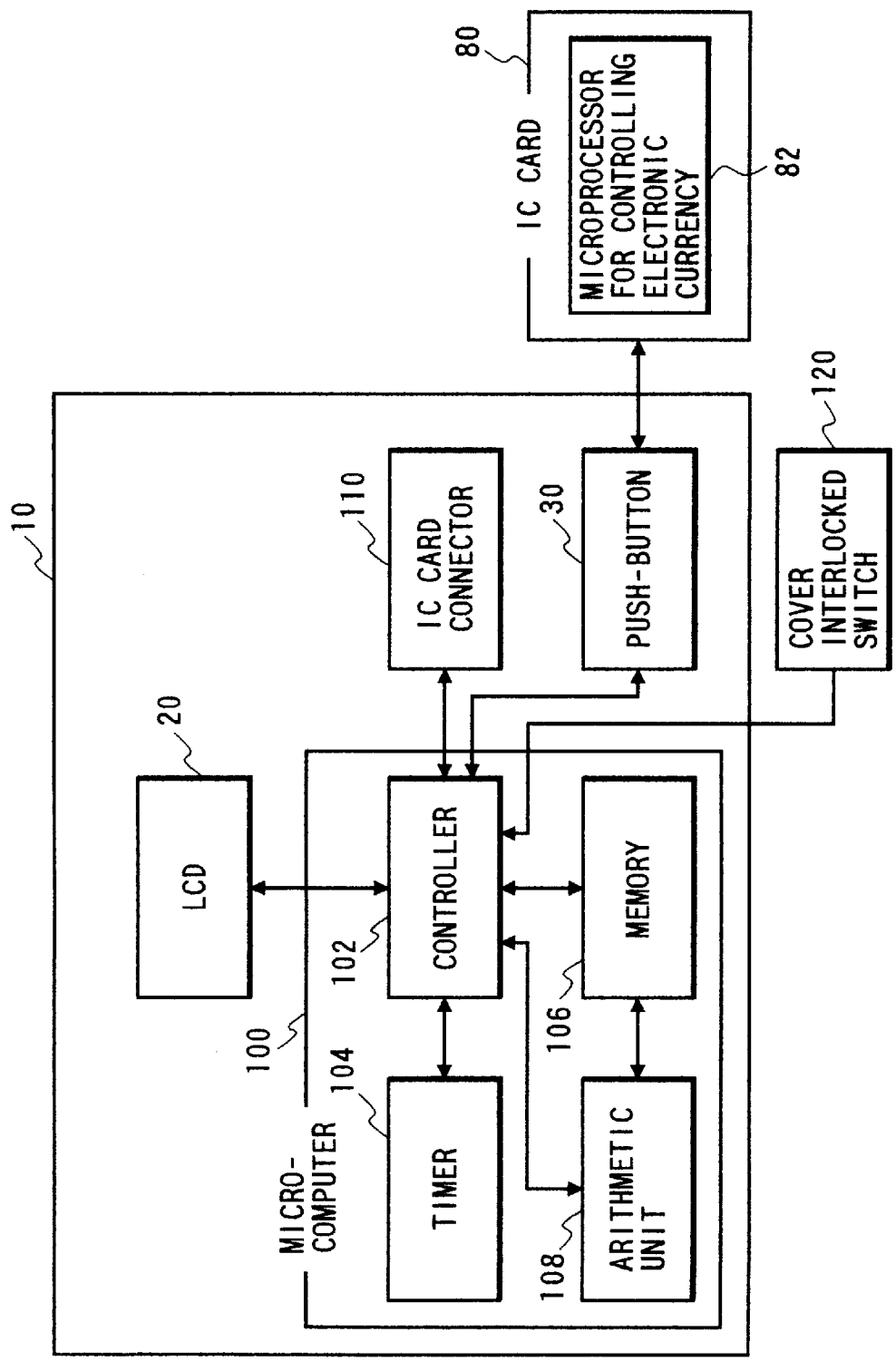
FIG. 8 is another functional block diagram showing elements for providing the balance reader according to the present invention.

FIG. 8 is a block diagram showing the addition of another function provided for the balance reader card holder according to the present invention. Specifically, the cover interlocked switch 120 discussed above regarding FIG. 5 is provided in addition to functions described in relation to FIG. 7.

Figure 9:
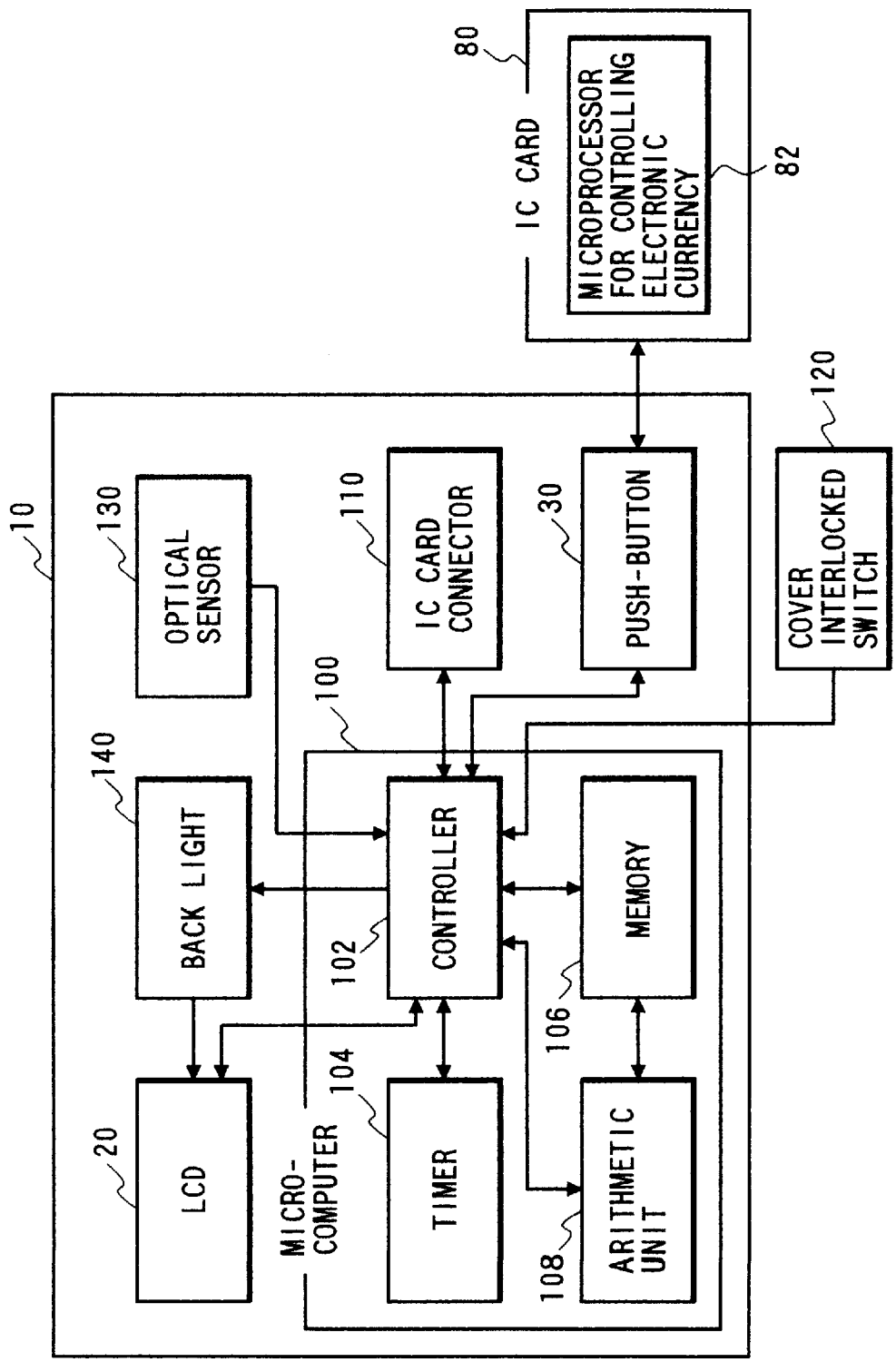
FIG. 9 is yet another functional block diagram showing elements for providing the balance reader according to the present invention.

FIG. 9 is a block diagram showing yet another function provided for the balance reader card holder according to the present invention. An optical sensor 130 and a back light 140 for the liquid-crystal display 20 are provided in addition to functions in relation to FIG. 8.

When the optical sensor 130 detects the darkness of environment, the back light 140 is lit to light the liquid-crystal display.

Figure 10:
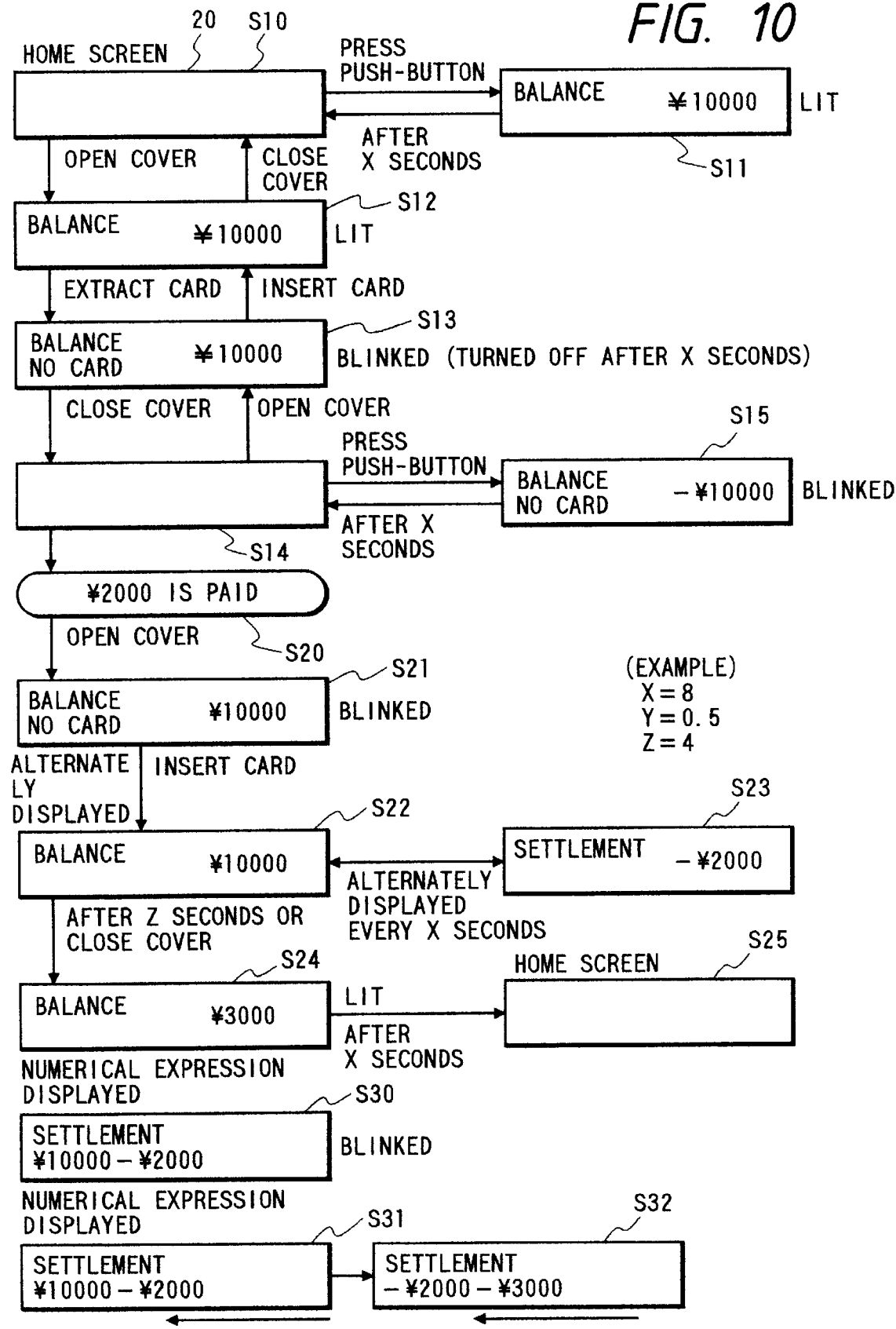
FIG. 10 is a flowchart showing operation steps for providing a display with the balance reader according to the present invention.

FIG. 10 is a flowchart showing the operation for display of a balance display according to the present invention.

The following display is made corresponding to each operation on the screen 20 which is a display provided on the body 10.

A step S10 shows the display of the screen 20 when no operation is performed in a state in which a card is housed in a balance reader and the screen is in a state in which lights are put out.

When the push-button 30 is pressed from this state, the balance data stored in the card is read as shown in a step S11 and the balance $10,000 is displayed. When X seconds elapse, the lights are put out, and the display is returned to a state shown in the step S10. However, time X can be set arbitrarily through the timer 104.

When the cover member 40 is opened, the cover interlocked switch 120 detects this operation, and transmits it to the microcomputer. When the microcomputer receives it, it instructs to display the current balance $10,000 as shown in a step S12.

When the card 80 is extracted from the slot 12 of the body 10, the display of the screen is changed to blinking display. That is, a balance reader according to the present invention is provided with a function for displaying data on the screen when a card is inserted into the body and for displaying final data by blinking when the card is extracted.

When the cover member is closed after the card is extracted, the screen is turned off as shown in a step S14. When the push-button 30 is pressed in this state, the final balance $10,000 is displayed by blinking as shown in a step S15 and lights are put out after X seconds. When the extracted card is not used and the card is returned to the slot of the body 10, processing is returned to an initial state shown in the step S10 via steps 13 and 12.

Next, a step S20 shows processing for paying $2,000 to a business connection by using the extracted card.

When the cover member is opened to return a card after a settlement into the body in a step S21, and before the card is actually inserted, the balance $10,000 before the settlement is displayed. When the card is inserted into the slot of the body after the settlement, the balance $10,000 before the settlement is first displayed by a step S22, and, after Y seconds elapse, a paid amount (the difference) $2,000 is displayed on the screen. Every Y seconds, steps S22 and S23 are alternately executed. However, time Y can be set arbitrarily via the timer 104.

When Z seconds elapse in this state or the cover member is closed, processing proceeds to a step S24, the current balance $8,000 after the settlement is displayed, and when X seconds elapse, the screen is turned off and is returned to a state shown in a step S25.

A step S30 shows an alternative display method for displaying the state of a settlement after the step S21 and processing for displaying the balance before the settlement of $10,000 and a paid amount $2,000 in a numerical expression. This display is blinked, for example, and it may be clarified that the balance and a paid amount are displayed in a numerical expression.

A step S31 shows yet another display method in which a numerical expression is scrolled. The numerical expression is scrolled as shown from the step S31 to a step S32 to show the balance before settlement and the paid amount, and, ultimately, the current balance $8,000 is displayed.

Figure 11:
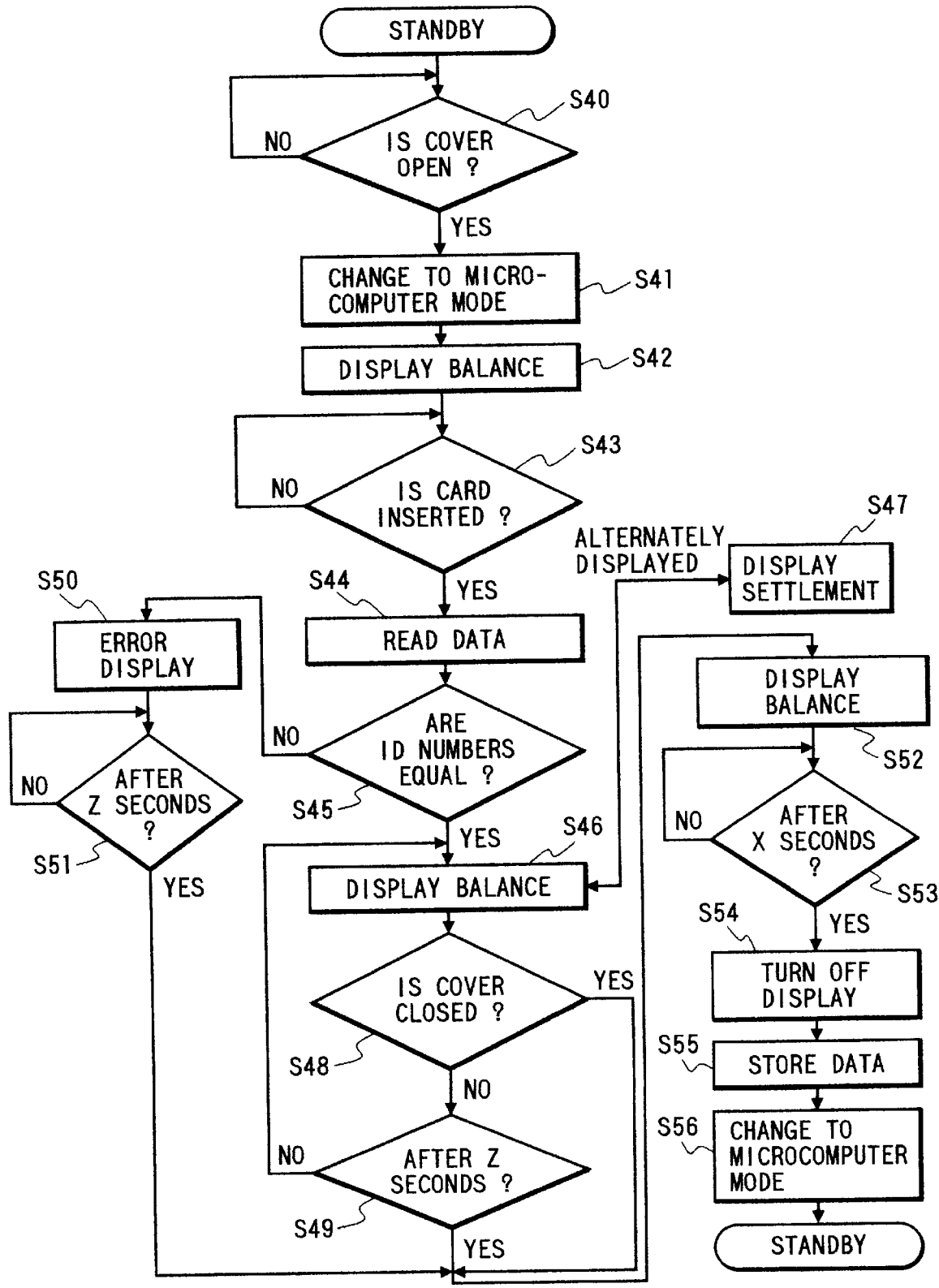
FIG. 11 is a flowchart showing the operation of a microcomputer of the balance reader according to the present invention.

FIG. 11 is a flowchart showing the operation of the microcomputer for providing a balance reader according to the present invention. FIG. 11 shows an example in which it is determined based upon the respective ID numbers whether a card before a settlement and a card after the settlement are identical or not. FIG. 11 also shows the operation of the microcomputer from a state in which a card is not inserted and the cover member is closed.

When it is detected in a step S40 that the cover member is opened, the microcomputer is returned from a low power consumption mode to a normal mode in a step S41 and the balance before the settlement is blinked in a step S42. When the card after the settlement is inserted into the slot of the body in a step S43, ID information in the card is read in a step S44. It is determined whether the ID number of the card before the settlement and that of the card after the settlement are identical or not in a step S45. If they are identical, processing proceeds to a step S46, the balance before the settlement is first displayed and a paid amount (the difference) is displayed in Y seconds in a step S47. Every Y seconds, the step S46 and the step S47 are alternately executed. In this state, when it is detected in a step S48 that the cover member is closed or Z seconds elapse in a step S49, processing proceeds to a step S52 and the balance is displayed.

If the respective ID numbers are not identical in the step S45, processing proceeds to a step S50 and a message "ERROR" is displayed. Next, when Z seconds elapse in a step S51, processing proceeds to a step S52.

If X seconds elapse in a step S53, the screen is turned off in a step S54, the ID information and the balance of the current card are stored in a step S55, and, after the microcomputer is returned to the low power consumption mode in a step S56, it is returned to a standby mode.

The above-mentioned flowchart is only an example of the flow of the operation of the microcomputer and the order of processing, determination or supervisory time can be changed.

In the above example, the microcomputer is in a low power consumption mode on standby to extend the life of a battery. If, for example, an HMCS-400 series microcomputer manufactured by Hitachi, Ltd. is used as the microcomputer 100, the power consumption can be minimized with the contents of its memory saved by setting the microcomputer to a stop mode and simultaneously stopping an oscillator added to an external device.

What is claimed is:

1. A card holder-type balance display, comprising:
   a body for housing a card having recorded information of an electronic currency;
   a screen for displaying said information recorded in said card, said screen being arranged on said body;
   a cover member arranged on said body so as to be opened or closed to permit insertion and extraction of the card into and from the body;
   a detector for detecting a condition whether said cover member is opened or closed; and
   a microcomputer located in said body for communicating with said card via a terminal,
   wherein said microcomputer further comprises:
      a first storing area for storing a first balance recorded in said card before a financial settlement using said card; and
      a control unit to control a display on said screen to display the balance during a predetermined time when said cover member is opened.

2. A card holder-type balance display, comprising:
   a body for housing a card having recorded information of an electronic currency;
   a screen for displaying said information recorded in said card, said screen being arranged on said body; and
   a microcomputer located in said body for communicating with said card via a terminal,
   wherein said microcomputer further comprises:
      a first storing area for storing a first balance recorded in said card before a financial settlement using said card; and
      a control unit to control a display on said screen to display the balance during a predetermined time when said card is extracted from said body.

3. A card holder-type balance display according to claim 1, wherein said microcomputer further includes a second storing area for storing a second balance recorded in said card after the settlement, an operating unit based upon said first balance and said second balance, and a control unit to control a display on said screen to display the result when the card is re-inserted in said body.

4. A card holder-type balance display according to claim 2, wherein said microcomputer further includes a second storing area for storing a second balance recorded in said card after the settlement, an operating unit based upon said first balance and said second balance, and a control unit to control a display on said screen to display the result when the card is re-inserted into said body.

5. A card holder-type balance display, comprising:
   a body for housing a card having recorded information of an electronic currency;
   a screen for displaying said information recorded in said card, said screen being arranged on said body;
   a cover member arranged on said body so as to be opened or closed to permit insertion and extraction of the card into and from the body;
   a detector for detecting a condition whether said cover member is opened or closed; and
   a microcomputer located in said body for communicating with said card via a terminal;
   wherein said microcomputer further comprises:
      a first storing area for storing a first balance recorded in said card before a financial settlement using said card; and
      a second storing area for storing a second balance recorded in said card after the settlement; and
      a control unit to control a display on said screen to display the balance during a predetermined time when said cover member is opened, and to display the operating result based upon said first balance and said second balance only if a card inserted in the body before the settlement and a card inserted in the body after the settlement are identical.

6. A card holder-type balance display, comprising:
   a body for housing a card having recorded information of an electronic currency;
   a screen for displaying said information recorded in said card, said screen being arranged on said body; and
   a microcomputer located in said body for communicating with said card via a terminal,
   wherein said microcomputer further comprises:
      a first storing area for storing a first balance recorded in said card before a financial settlement using said card; and
      a second storing area for storing a second balance recorded in said card after the settlement; and
   a control unit to control a display on said screen to display the balance during a predetermined time when said card is extracted from said body and to display the operating result based upon said first balance and said second balance only if a card inserted in the body before the settlement and a card inserted in the body after the settlement are identical.

7. A card holder-type balance display according to claim 2, wherein the control unit operates to control the display to operate as a blinking display during the predetermined time when the card is extracted from said body.

8. A card holder-type balance display according to claim 5, wherein the control unit operates to control the display to operate as a blinking display during the predetermined time when the card is extracted from said body.

9. A card holder-type balance display according to claim 1, wherein the control unit controls the display on the screen to display the balance as a blinking display for a second predetermined time when said card is extracted from said body.

10. A card holder-type balance display according to claim 5, wherein the control unit controls the display on the screen to display the balance as a blinking display for a second predetermined time when said card is extracted from said body.

* * * * *